United States Patent
Hofmann et al.

(10) Patent No.: US 10,973,057 B2
(45) Date of Patent: Apr. 6, 2021

(54) MODIFIED MULTI-SLOT EXTENDED COVERAGE RANDOM ACCESS CHANNEL TRANSMISSION

(71) Applicant: Nokia Technologies Oy, Espoo (FI)

(72) Inventors: Juergen Hofmann, Munich (DE); Sathiaseelan Sundaralingam, Camberley (GB); Hartmut Wilhelm, Ulm (DE); Srinivasan Selvaganapathy, Bangalore (IN); Muneender Chiranji, Hyderabad (IN)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 16/340,070

(22) PCT Filed: Oct. 6, 2017

(86) PCT No.: PCT/FI2017/050704
§ 371 (c)(1),
(2) Date: Apr. 5, 2019

(87) PCT Pub. No.: WO2018/073490
PCT Pub. Date: Apr. 26, 2018

(65) Prior Publication Data
US 2020/0059966 A1    Feb. 20, 2020

(30) Foreign Application Priority Data

Oct. 19, 2016 (IN) .............................. 201641035743

(51) Int. Cl.
*H04W 74/08* (2009.01)
*H04L 1/00* (2006.01)
(Continued)

(52) U.S. Cl.
CPC ....... *H04W 74/0833* (2013.01); *H04L 1/0008* (2013.01); *H04L 27/2607* (2013.01); *H04W 72/0446* (2013.01); *H04W 72/0466* (2013.01)

(58) Field of Classification Search
CPC ......... H04W 74/0833; H04W 72/0446; H04W 72/0466; H04W 74/02; H04W 56/00;
(Continued)

(56) References Cited

U.S. PATENT DOCUMENTS 5,642,354 A    6/1997  Spear
6,430,417 B1   8/2002  Raith et al.
(Continued)

FOREIGN PATENT DOCUMENTS

CN    1665317 A    9/2005
CN    1703852 A    11/2005
(Continued)

OTHER PUBLICATIONS

Office action received for corresponding Russian Patent Application No. 2019112879, dated Nov. 6, 2019, 7 pages of office action and no page of translation available.
(Continued)

*Primary Examiner* — Brian T O Connor
(74) *Attorney, Agent, or Firm* — Nokia Technologies Oy

(57) ABSTRACT

Systems, methods, apparatuses, and computer program products for a modified multi-slot random access channel (RACH) transmission, such as an extended coverage RACH (EC-RACH) transmission, are provided. One method includes transmitting, by a mobile station associated with a network, a dual slot hybrid random access channel including a long burst followed by one access burst or including one access burst followed by one long burst. Two consecutive time slots may be used for the random access channel transmission.

20 Claims, 6 Drawing Sheets

(51) Int. Cl.
*H04L 27/26* (2006.01)
*H04W 72/04* (2009.01)

(58) Field of Classification Search
CPC . H04L 1/0008; H04L 27/2607; H04L 5/0035; H04L 5/0048; H04L 5/001; H04L 5/0023; H04B 7/26
See application file for complete search history.

(56) References Cited

U.S. PATENT DOCUMENTS

| | | | |
|---|---|---|---|
| 7,043,617 | B2 | 5/2006 | Wiliams |
| 9,007,994 | B2 | 4/2015 | Kreuzer et al. |
| 9,226,254 | B2 | 12/2015 | Hole et al. |
| 9,226,308 | B2 | 12/2015 | Ketchum et al. |
| 9,370,026 | B2 | 6/2016 | Hole et al. |
| 9,451,639 | B2 | 9/2016 | Li et al. |
| 2003/0156594 | A1 | 8/2003 | Trott et al. |
| 2007/0025285 | A1 | 2/2007 | Li |
| 2011/0222527 | A1 | 9/2011 | Hole et al. |
| 2016/0050660 | A1 | 2/2016 | Hofstrom et al. |
| 2020/0053787 | A1* | 2/2020 | Sundberg .......... H04W 74/0866 |

FOREIGN PATENT DOCUMENTS

| | | | |
|---|---|---|---|
| CN | 101299873 A | 11/2008 | |
| CN | 103081554 A | 5/2013 | |
| EP | 3007500 A1 | 4/2016 | |
| RU | 2445754 C2 | 3/2012 | |
| WO | 2008/150206 A1 | 12/2008 | |
| WO | 2016/050072 A1 | 4/2016 | |

OTHER PUBLICATIONS

"Draft Report of Ad-hoc Geranl Meeting on Ciot#3, Version 0.0.2", 3GPP TSG GERAN1#67, TDoc GP-150707, Agenda: 7.1.3.1, Secretary TSG GERAN WG1, Aug. 10-13, 2015, pp. 1-79.

"3rd Generation Partnership Project; Technical Specification Group Radio Access Network; GSM/EDGE Multiplexing and multiple access on the radio path (Release 14)", 3GPP TS 45.002, V14.2.0, Jun. 2017, pp. 1-145.

International Search Report and Written Opinion received for corresponding Patent Cooperation Treaty Application No. PCT/FI2017/050704, dated Jan. 23, 2018, 18 pages.

"Radio Interface Enhancements for EC-GSM-IoT—New Access Burst Formats", 3GPP TSG RAN6#2, Tdoc R6-160159, Agenda: 7.3.1, Ericsson LM, Nov. 14-18, 2016, pp. 1-4.

"UL MCL Improvement for Low Power Devices in EC-GSM-IoT—Concept Overview", 3GPP TSG RAN WG6 #2, R6-160175, Agenda: 7.3.1, Nokia, Nov. 14-18, 2016, pp. 1-8.

Extended European Search Report received for corresponding European Patent Application No. 17861503.5, dated Apr. 20, 2020, 8 pages.

"EC-GSM-Random Access Procedure", 3GPP TSG GERAN #65, Tdoc GP-150136, Agenda:7.1.5.3.5, 7.2.5.3.4, Ericsson, Mar. 9-13, 2015, pp. 1-8.

Office action received for corresponding Indian Patent Application No. 201641035743, dated Jul. 14, 2020, 7 pages.

Office action received for corresponding Chinese Patent Application No. 201780064650.4, dated Oct. 10, 2020, 8 pages of office action and 3 pages of translation available.

"EC-GSM, Adjusting the Estimated Coverage Class", 3GPP TSG GERAN FS_IoT_LC Adhoc#2, Tdoc GPC-150223, Agenda: 2.4.2.1, Ericsson LM, Apr. 20-23, 2015, pp. 1-2.

* cited by examiner

| TN0 | 8 | TSC(41) | Data(36) | 3 | GP=69 |
| TN1 | 8 | TSC(41) | Data(36) | 3 | GP=68 |

Fig. 1

| TN0 | 8 | TSC(50) | Data(27) | 3 | Data(27) | 3 | Data(27) | 3 | GP(9) |
| TN1 | 8 | TSC(50) | Data(27) | 3 | GP(68) | | | | |

Fig. 2

| TN0 | 8 | TSC(62) | Data(36) | 3 | Data(36) | 3 | GP(9) |
| TN1 | 10 | Data(36) | 3 | Data(36) | 3 | GP=68 | | |

Fig. 3

| TN0 | 8 | Data(36) | 3 | Data(36) | TSC(62) | 3 | GP(9) |
| TN1 | 8 | Data(36) | 3 | Data(36) | 5 | GP=68 | |

Fig. 4

MODIFIED MULTI-SLOT EXTENDED COVERAGE RANDOM ACCESS CHANNEL TRANSMISSION

RELATED APPLICATION

This application was originally filed as PCT Application No. PCT/FI2017/050704, filed on 6 Oct. 2017, which claims priority benefit from Indian Patent Application No. 201641035743, filed Oct. 19, 2016.

BACKGROUND

Field

Embodiments of the invention generally relate to wireless or mobile communications networks, such as, but not limited to, the Global System for Mobile Communications (GSM)/Enhanced Data rates for GSM Evolution (EDGE) radio access network (GERAN), the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, narrow band internet of things (NB-IoT), and/or 5G radio access technology or new radio access technology (NR). Some embodiments may generally relate to GSM/EDGE extended coverage support for the internet of things (EC-GSM-IoT) and/or to modified multi-slot extended coverage (EC) random access channel (RACH) transmission, for example, to improve link level performance.

Description of the Related Art

Global System for Mobile Communications (GSM) is a standard initially developed by the European Telecommunications Standards Institute (ETSI) and later by the $3^{rd}$ Generation Partnership Project (3GPP) to describe the protocols for second-generation digital cellular networks used by mobile phones. The GSM standard originally described a digital, circuit-switched network optimized for full duplex voice telephony. GSM was enhanced over time to include data communications by circuit-switched transport and then by packet data transport via General Packet Radio Services (GPRS) and Enhanced Data rates for GSM Evolution (EDGE or EGPRS). Subsequently, 3GPP developed third-generation UMTS standards followed by fourth-generation LTE-Advanced standards.

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation wireless systems (5G) refers to the new generation of radio systems and network architecture. 5G is expected to provide higher bitrates and coverage than the current LTE systems. Some estimate that 5G will provide bitrates one hundred times higher than LTE offers. 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. Narrowband IoT (NB-IoT) is envisioned to operate on 180/200 kHz channel. The deployment of NB-IoT may be in-band LTE, a guard band to LTE, UMTS or other system as well as stand-alone on a specific carrier.

SUMMARY

One embodiment is directed to a method that may include transmitting, by a mobile station associated with a network, a dual slot hybrid random access channel comprising a long burst followed by one access burst or one access burst followed by one long burst, where two consecutive time slots are used for the random access channel transmission.

Another embodiment is directed to an apparatus including transmitting means for transmitting a dual slot hybrid random access channel comprising a long burst followed by one access burst or one access burst followed by one long burst, where two consecutive time slots are used for the random access channel transmission.

Another embodiment is directed to an apparatus, which may include at least one processor and at least one memory including computer program code. The at least one memory and computer program code are configured, with the at least one processor, to cause the apparatus at least to transmit a dual slot hybrid random access channel comprising a long burst followed by one access burst or one access burst followed by one long burst, where two consecutive time slots are used for the random access channel transmission.

Another embodiment is directed to a method that may include receiving, by a network node, a dual slot hybrid random access channel comprising a long burst followed by one access burst or one access burst followed by one long burst, where two consecutive time slots are used for random access channel transmission.

Another embodiment is directed to an apparatus including receiving means for receiving a dual slot hybrid random access channel comprising a long burst followed by one access burst or one access burst followed by one long burst, where two consecutive time slots are used for random access channel transmission.

Another embodiment is directed to an apparatus, which may include at least one processor and at least one memory including computer program code. The at least one memory and computer program code are configured, with the at least one processor, to cause the apparatus at least to receive a dual slot hybrid random access channel comprising a long burst followed by one access burst or one access burst followed by one long burst, where two consecutive time slots are used for random access channel transmission.

BRIEF DESCRIPTION OF THE DRAWINGS

For proper understanding of the invention, reference should be made to the accompanying drawings, wherein:

FIG. 1 illustrates the 2TS EC-RACH transmission scheme for 3GPP Rel-13 (Release 13) EC-GSM-IoT;

FIG. 2 illustrates an example of a dual slot hybrid EC-RACH transmission with 2*TSC and 4*Data bits, according to an embodiment;

FIG. 3 illustrates an example of a dual slot hybrid EC-RACH with one long TSC and 4*Data bits, according to an embodiment;

FIG. 4 illustrates an example of a dual slot hybrid EC-RACH with one long TSC in the middle of 4*Data bits, according to an embodiment;

DETAILED DESCRIPTION

Figure 5A:
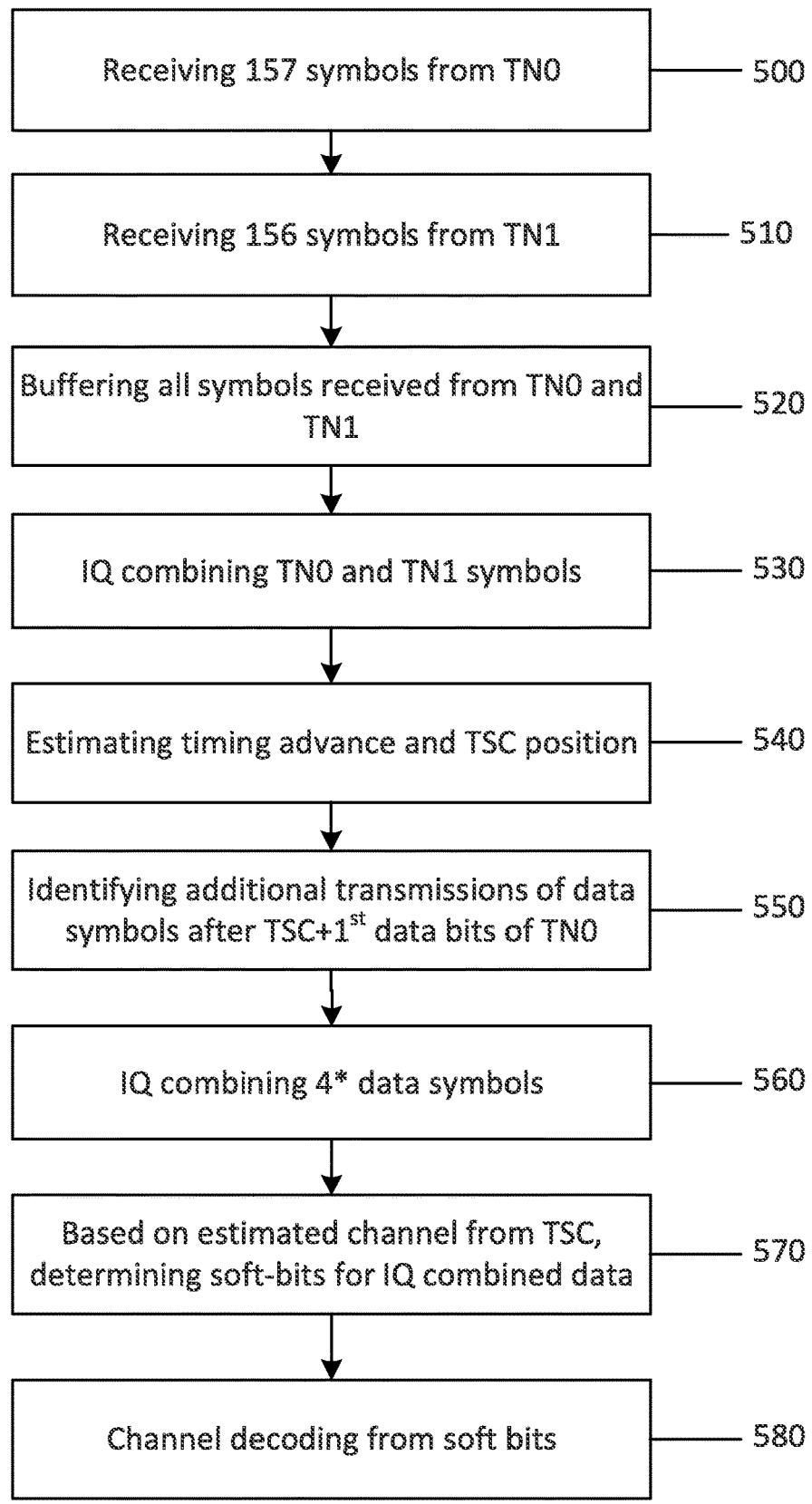
FIG. 5a illustrates an example of flow diagram depicting a method, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for a modified multi-slot random access channel (RACH) transmission, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Maximum coupling loss (MCL) performance of an extended coverage (EC) global system for mobile communications (GSM) IoT device, for example, with 23 dBm transmit power is 154 dB compared to 164 dB for an NB-IoT device with the same transmit power. It is important to improve the uplink performance of an EC-GSM-IoT device with 23 dBm as much as possible in order to bridge the gap between technologies. In addition, MCL improvement for the EC-RACH channel may be more challenging than for other channels as this is observed as limiting channel for uplink performance. Increasing the number of blind physical layer transmissions alone is not sufficient to achieve the required additional coverage improvement.

Therefore, MCL improvement for low power EC-GSM-IoT device (e.g., 23 dBm transmit power) is needed to match the performance with other technologies. In particular, MCL improvement for EC-RACH likely represents the major challenge. Furthermore, the power consumption of the device during access and data transfer needs to be minimized. Embodiments of the invention are able to solve at least these problems. For example, certain embodiments of the invention provide a new transmission mechanism for multi-slot transmission of EC-RACH which is expected to achieve additional coverage gain without increasing the number of transmissions.

The current 2 timeslot (TS) EC-RACH transmission in 3GPP Rel-13 operates as follows: access bursts are transmitted in a phase coherent manner in two consecutive time slots by the device in extended coverage and this sequence of two access bursts is repeated in consecutive TDMA frames; and the base station coherently inphase and quadrature (IQ) combines the symbols of the two bursts and estimates the timing advance first by finding the training sequence code (TSC) location. Once the timing advance is calculated, the base station uses the training sequence for channel estimation and further processes the data bits for channel decoding.

An embodiment of the invention provides a hybrid dual slot scheme which improves random access channel, such as the 2TS EC-RACH, performance significantly without increasing the number of transmissions.

An embodiment is directed to a new transmission scheme for dual slot (2TS) EC-RACH including changes to the transmission scheme provided for 2TS EC-RACH in 3GPP Rel-13, as will be discussed in the following. According to one embodiment, from two slots used for multi-slot access burst transmission (2TS EC-RACH), instead of transmitting the same signal, i.e., the access burst on first slot (e.g., timeslot number 0 (TN0)) and second slot (e.g. timeslot number 1 (TN1)), a different signal may be transmitted for example by using a long burst, which has a length that is longer than an access burst, in the first slot (e.g., TN0) and the access burst in the second slot (e.g., TN1). According to one embodiment, in the context of GSM, the long burst may have a length that is equal to a normal burst. It is noted that a normal burst in GSM refers to a burst with a specific number of data and training bits (e.g., in GSM, a normal burst length is 148 symbols +8.25 guard symbols, and an access burst length is 88 symbols +68.25 guard symbols).

In an embodiment, although the bursts are not identical, they may be transmitted with phase coherency (i.e., with a specified phase relationship between the adjacent bursts). In one embodiment, not only the access burst, but also the long burst may be transmitted with a timing advance (TA) of 0 irrespective of the distance between the mobile station (MS) and the base station. By applying the approach provided by certain embodiments of the invention, it may be ensured that the access from a distant mobile station (MS), which is comprised of both bursts, can still be received by the base station in both slots.

The additional symbols transmitted in the long burst may be utilized to send multiple copies of the access burst's encoded data block in the long burst. As a result, coherent IQ combining of different instances of the encoded data block across long burst and access burst is enabled at the receiver, for example 4 copies of the encoded data block (cf. FIGS. 2-4 and 7) instead of 2 copies (cf. FIG. 1). If sensitivity improvement is needed, the additional symbols transmitted in the long burst may be utilized to increase the training sequence length and/or have multiple copies of data. If sensitivity improvement is not needed (i.e., not of a concern which is applicable for good coverage devices), the additional symbols can be utilized to transfer some more information data.

According to another embodiment, the sequence of long burst and access burst may be swapped. For example, an access burst transmitted with TA 0 is followed by a long burst transmitted with a high TA, such as in the range from 60 to 63. The long burst's TA may be predefined and independent of the distance between the MS and the base station. Also in this case, the bursts may be transmitted with phase coherency.

In an embodiment, upon receipt of the transmission, the base station may first IQ combine blind physical layer transmissions of both the bursts and identify the TSC location and start of burst based on the cross correlation energy. The combination of long burst and access burst is identified by a particular TSC, which is different to TSC's specified in 3GPP Rel-13 for EC-RACH. After identifying the start of both bursts, the base station may identify the positions of the different instances of the encoded data block within the two bursts. The base station may use these multiple copies of the encoded data block contained in both bursts to perform coherent IQ combining of the data symbols, equalize the data symbols and decode the data bits. In an embodiment, the base station may also perform soft combining of the data symbols after equalization of both bursts and use this result in combination with coherent IQ combining for optimum decoding. Embodiments of the invention are able to yield superior link level performance over 3GPP Rel-13 2TS EC-RACH channel.

In one embodiment, the access burst transmission by the MS can be extended into the guard period (GP) without changing any of the existing bits of access burst if, instead of timing advance 0, the MS transmits with the TA that the base station commanded and that corresponds to its distance to the base station. In this case, the MS may indicate the presence of additional bits in the RACH guard period (GP) as part of data bits transmitted. With 60 available bits as part of the RACH guard period (total GP=68.25 bits), it is possible to send 24 payload bits which are encoded using the same channel coding scheme as data bits.

Therefore, according to an embodiment, the MS may inform the network (e.g., base station) in the access burst's usual data bits that it has additional information to send in the RACH guard period if it knows the timing advance to be applied. Because when the base station receives the access burst and estimates timing advance, if the timing advance is 0, it does not know whether MS is really close-by or whether it uses preserved timing advance. The base station acquires this knowledge by decoding the data bits. This embodiment is beneficial to improve the contention resolution from devices which have known timing advance because the additional 24 bits can carry some bits of MS identity for contention resolution.

More generally, the MS may use a lower TA than commanded (this is useful to preserve the guard period at the base station's uplink if the MS might have got closer to the base station since the reception of the last TA command) and extend the access burst by less than 60 bits (this is needed if a lower TA than commanded is applied and is also useful if the MS might have got farer from the base station since the reception of the last TA command). The extension of the access burst may be used if the access burst is sent after the normal burst. Otherwise, although most of the embodiments and examples herein refer to a long burst followed by an access burst, the sequence of long burst and access burst can be swapped.

FIG. 1 illustrates the existing 2TS EC-RACH transmission scheme for Rel-13 EC-GSM-IoT, using 88 bit long access burst (AB) format. There are 8 extended tail bits at the beginning, 41 synchronization sequence bits that correspond to and are referred to as TSC, 36 data bits (after encoding) and 3 tail bits at the end of the burst. GP=69 and GP=68 denote the number of guard period bits at the end of timeslot number (TN) 0 and 1, respectively. In FIG. 1, as well as the embodiments of FIGS. 2-4 and 7 discussed below, transmission of bursts in TN0 and TN1 is phase coherent. Furthermore, in FIGS. 1-4, both bursts are transmitted with TA 0.

FIG. 2 illustrates an example of a dual slot hybrid EC-RACH transmission with 2*TSC and 4*Data bits, according to an embodiment. In this embodiment, the TSC is extended to 50 bits and the data bits are reduced to 27 bits by optimising the EC-RACH payload bits from 11 bits to 7 or 8 bits. This design provides 4*coherent transmissions of data bits in two subsequent time slots compared to 2*coherent transmissions of data bits of 3GPP Rel-13 2TS EC-RACH transmission. In an embodiment, the 3 guard bits (which are shown between the data bits segments, serve for reducing unknown inter-symbol interference between the data bit segments and should not be confused with the guard period bits at the end of a timeslot) and 3 tail bits (shown before the guard period) are the same as the last 3 training bits (i.e., TSC bits), respectively.

FIG. 3 illustrates an example of another embodiment of a dual slot hybrid EC-RACH with one long TSC and 4*Data bits. More specifically, FIG. 3 illustrates an example of a dual slot hybrid EC-RACH where the TSC transmission is extended to 1.5 times length, i.e., 62 bits, instead of repeating the TSC in the second time slot and with just data bits (as well as tail and guard bits) transmitted in the access burst sent in TN1, according to one embodiment. In this embodiment, the TSC transmission is extended instead of splitting across 2 TS and the access burst of TN1 carries only data bits. The last 3 of the 10 extended tail bits at the beginning of TN1 and the 3 guard or tail bits following the Data (e.g., 36 bits) segments are the same as the last 3 training bits. Also, in this embodiment, data bits may be transmitted 4 times within TN0 and TN1 with long burst and access burst transmissions in the two subsequent time slots. The data block size is 36 bit, which is the same as that for 3GPP Rel-13 2 TS EC-RACH.

FIG. 4 illustrates an example of a dual slot hybrid EC-RACH with one long TSC in the middle of 4*Data bits, according to an embodiment. In the embodiment illustrated in FIG. 4, the last 3 of the 8 extended tail bits at the beginning of the bursts as well as the 3 guard bits and the first 3 of the 5 tail bits following the Data(36) segments are the same as the first 3 training bits.

Figure 7:
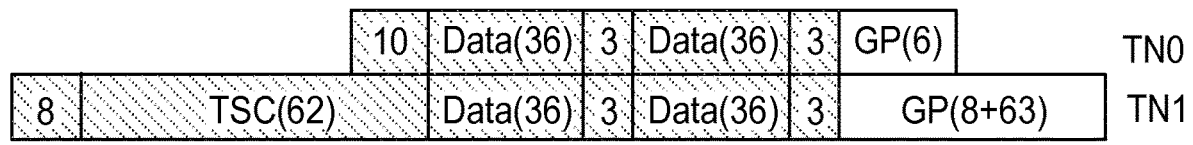
FIG. 7 illustrates an example of a dual slot hybrid EC-RACH with one long TSC in the middle of 4*Data bits, according to an embodiment.

FIG. 7 illustrates an example of another embodiment of a dual slot hybrid EC-RACH with one long TSC in the middle of 4*Data bits. Compared with FIG. 3, the order of the bursts is reversed—the access burst on TN0 precedes the long burst on TN1. As usual, no timing advance is applied to the access burst. To the long burst, however, a timing advance of 63 is applied to minimize the gap between the access burst and the long burst and to have at the base station uplink, even if the distance between the MS and the base station is 35 km, a sufficiently long guard period after the long burst. In the embodiment illustrated in FIG. 7, the last 3 of the 10 extended tail bits at the beginning of the access burst and the 3 guard or tail bits following the Data(36) segments are the same as the last 3 TSC bits. The Data(36) segments may be identical blocks of encoded data bits.

It is noted that, in the foregoing embodiments (e.g., FIGS. 2, 3, 4 and 7), the 3 tail, guard, or training bits preceding/following the data bit segments are identical. This will allow for terminating a trellis equalizer into known bits even after an IQ accumulation.

The selection of the dual slot hybrid EC-RACH format may be broadcasted by the network (e.g., base station/eNB). For instance, for signaling a payload of 11 bits, the network may command the device (e.g., MS/UE) to use the dual slot hybrid EC-RACH format with one long TSC and 4*Data bits, whereas for signaling a shorter payload the dual slot hybrid EC-RACH format with 2*TSC and 4*Data bits may be commanded to be used. The dual slot hybrid EC-RACH format may, among other parameters, also include the order of sequence of the normal burst and access burst (FIGS. 2, 3, 4 and 7) and points to a combination of access burst and normal burst with predefined burst structures.

One embodiment is directed to a process that includes transmitting, for example by a MS or UE, a dual time slot hybrid random access channel comprised of one long burst followed by one access burst in case two consecutive time slots are used for random access channel transmission. In an embodiment, the dual time slot hybrid random access channel is a dual time slot hybrid EC-RACH. In an embodiment, when sensitivity performance is needed, additional bits are included in the long burst (compared with two subsequent access bursts) and the additional bits may be used for more training bits and/or more repetitions of data bits. When sensitivity performance improvement is not needed, the additional bits may be used to carry some more information, such as if small data needs to be transferred or some identifier needs to be sent for faster contention resolution. For example, the additional bit positions of the long burst transmission after the training sequence and subsequent first block of data bits may be used for blind physical layer transmissions of the first block of data bits and the first block of data bits may also be repeated once or multiple times in the second burst (i.e., the access burst).

Upon receipt of the dual time slot hybrid random access channel (e.g., dual time slot hybrid EC-RACH) including the long burst and the access burst, a base station (or eNB) may identify the additional transmitted bits after timing advance estimation and include them to IQ combining of data bits. The base station may also broadcast to the device (e.g., MS/UE) which format of the dual slot hybrid random access channel (e.g., dual time slot hybrid EC-RACH) is to be used, and the device may then select the appropriate format for channel access. In an embodiment, the base station may achieve improved timing advance estimation through the use of longer TSC(s), IQ combining of the TSC symbols and cross correlation in two consecutive time slots in one or more TDMA frames. Additionally, in an embodiment, the base station may achieve improved channel estimation through the use of longer TSC(s), IQ combining of the TSC symbols and cross correlation in two consecutive slots in one or more TDMA frames.

FIG. 5a illustrates an example of flow diagram depicting a method of the random access channel (e.g., EC-RACH) processing at a base station, according to one embodiment. As illustrated in the example of FIG. 5a, the method may include, at 500, receiving 157 symbols from TN0 and, at 510, receiving 156 symbols from TN1. The method may then include, at 520, buffering all symbols received from TN0 and TN1. In an embodiment, at 530, the base station may IQ combine TN0 and TN1 symbols. The method may also include, at 540, estimating timing advance and TSC position and, at 550, identifying additional transmissions of data symbols after TSC+1$^{st}$ data bits of TN0. In one embodiment, the method may also include, at 560, IQ combine 4*data symbols. At 570, the method may include, based on estimated channel from TSC, determining soft-bits for IQ combined data. The method may then include, at 580, channel decoding from soft bits.

Figure 5B:
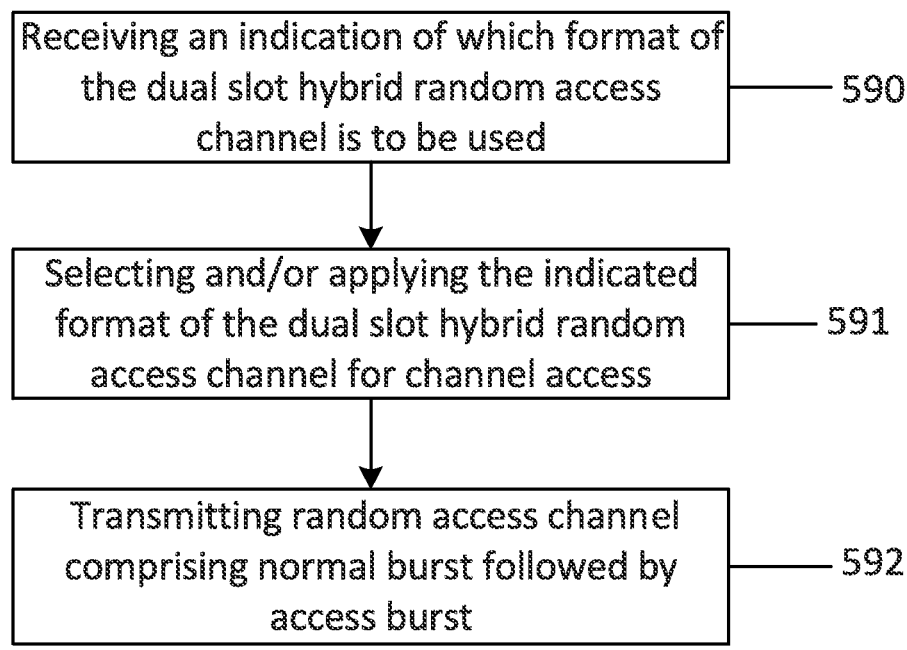
FIG. 5b illustrates an example of flow diagram depicting a method, according to another embodiment.

FIG. 5b illustrates an example of flow diagram depicting a method of the random access channel (e.g., EC-RACH) transmission at a UE or MS, for example, according to one embodiment. The method may include, at 590, receiving, from the network, an indication of which format of the dual slot hybrid random access channel (e.g., EC-RACH) is to be used. The method may also include, at 591, selecting and/or applying the indicated format of the dual slot hybrid random access channel (e.g., EC-RACH) for channel access. The method may then include, at 592, transmitting, based on the applied format, a dual slot hybrid random access channel (e.g., EC-RACH) comprising one long burst (e.g., a burst with a length equal to a normal burst) followed by one access burst, where two consecutive time slots are used for random access channel (e.g., EC-RACH) transmission. In an embodiment, additional bits included in the long burst are used for more training bits and/or more repetitions of data bits. The additional bits of the long burst after the training bits and subsequent first block of data bits may be used for blind physical layer transmissions of the first block of data bits, and the first block of data bits may also be repeated at least once in the access burst.

Figure 6A:
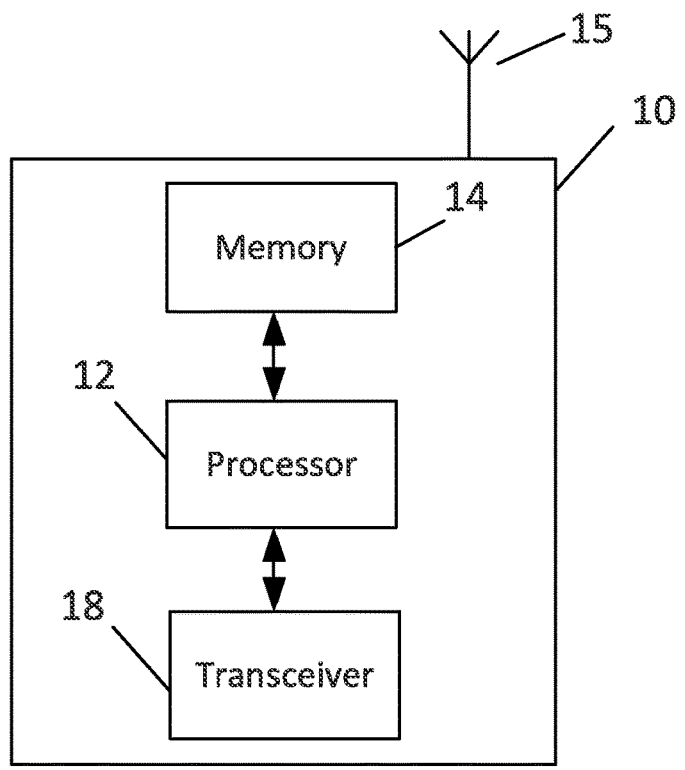
FIG. 6a illustrates a block diagram of an apparatus, according to one embodiment.

FIG. 6a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, WLAN access point, mobility management entity (MME), or subscription server associated with a radio access network, such as a GSM network, LTE network or 5G radio access technology. It should be noted that one of ordinary skill in the art would understand that apparatus 10 may include components or features not shown in FIG. 6a.

As illustrated in FIG. 6a, apparatus 10 may include a processor 12 for processing information and executing instructions or operations. Processor 12 may be any type of general or specific purpose processor. While a single processor 12 is shown in FIG. 6a, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or server, such as a base station, node B, eNB, 5G node B or access point, for example. According to certain embodiments, apparatus 10 may be controlled by memory 14 and processor 12 to perform the functions associated with embodiments described herein, such as the flow chart depicted in FIG. 5a. For example, in an embodiment, apparatus 10 may be controlled by memory 14 and processor 12 to receive a dual slot hybrid random access channel, such as a dual slot hybrid extended coverage random access channel (EC-RACH), comprising one long burst followed by one access burst, where two consecutive time slots are used for random access channel (or EC-RACH) transmission. As mentioned above, a long burst refers to a burst that has a length that is longer than an access burst and, in one embodiment, a long burst may have a length that is equal to a normal burst.

According to one embodiment, apparatus 10 may be controlled by memory 14 and processor 12 to IQ combine both of the bursts, and to identify the synchronization sequence or training sequence code (TSC) location and the start of the bursts. For example, in an embodiment, this may include IQ combining both bursts in every TDMA frame and also IQ combining each burst content across TDMA frames and buffering them to find out the additional bits for IQ combining based on the buffered contents of each burst.

After identifying the start of both bursts, in one embodiment, apparatus 10 may be controlled by memory 14 and processor 12 to identify positions of additional bits in the bursts. According to certain embodiments, apparatus 10 may then be controlled by memory 14 and processor 12 to use the additional bits to perform coherent IQ combining of the data bits. In one embodiment, apparatus 10 may also be controlled by memory 14 and processor 12 to equalize the data bits and decode the data bits.

Figure 6B:
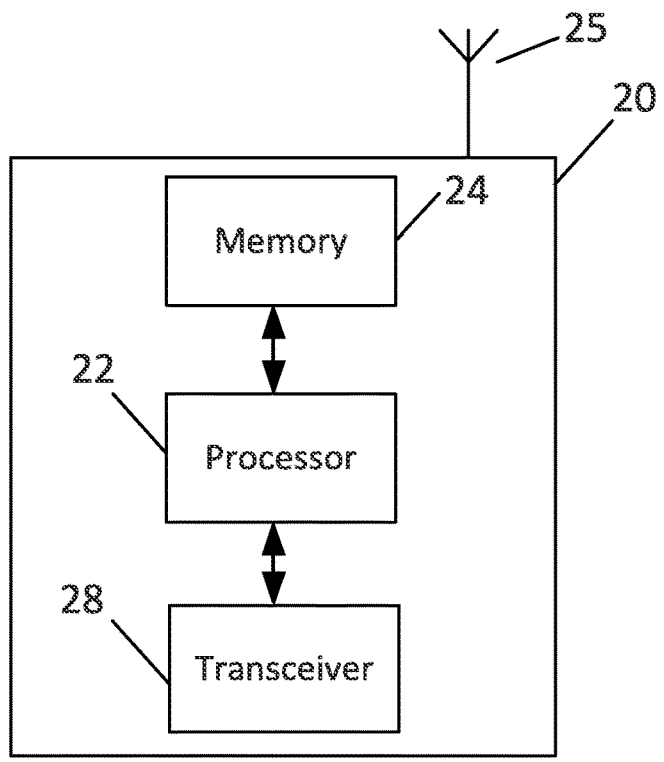
FIG. 6b illustrates a block diagram of an apparatus, according to another embodiment.

FIG. 6b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, Apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, NB-IoT, LTE, LTE-A, 5G, WLAN, WiFi, Bluetooth, NFC, and any other radio access technologies. It should be noted that one of ordinary skill in the art would understand that apparatus 20 may include components or features not shown in FIG. 6*b*.

As illustrated in FIG. 6*b*, apparatus 20 may include or be coupled to a processor 22 for processing information and executing instructions or operations. Processor 22 may be any type of general or specific purpose processor. While a single processor 22 is shown in FIG. 6*b*, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, NB-IoT, LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. In one embodiment, apparatus 20 may be controlled by memory 24 and processor 22 to transmit a dual slot hybrid random access channel, such as a dual slot hybrid extended coverage random access channel (EC-RACH), comprising one long burst followed by one access burst, where two consecutive time slots are used for random access channel (or EC-RACH) transmission. In an embodiment, additional bits included in the long burst are used for more training bits and/or more repetitions of data bits. The additional bits of the long burst after the training bits and subsequent first block of data bits may be used for blind physical layer transmissions of the first block of data bits, and the first block of data bits may also be repeated at least once in the access burst. According to certain embodiments, apparatus 20 may also be controlled by memory 24 and processor 22 to receive, from the network, an indication of which format of the dual slot hybrid random access channel (or EC-RACH) is to be used. In an embodiment, apparatus 20 may then be controlled by memory 24 and processor 22 to select and/or apply the indicated format of the dual slot hybrid random access channel (or EC-RACH) for channel access.

It has been determined via simulations that Link Level Performance of the new 2TS EC-RACH schemes provided by embodiments of the invention is improved. With the use of embodiments of the invention, without increasing the number of 2TS EC-RACH transmissions further, up to 1.5 dB improvement is possible by modifying the dual slot transmission scheme itself. Without the use of the modifications provided by embodiments of the invention, this gain is possible only by increasing the number of 2TS EC-RACH transmissions from 48 to 68 (41% increase in number of transmissions required for 1.5 dB gain).

Therefore, embodiments of the invention provide several technical improvements and/or advantages. For example, as a result of certain embodiments, improved link level performance can be achieved. As such, embodiments of the invention can improve performance and throughput of network nodes including, for example, base stations/eNBs and UEs. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor.

In some embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One embodiment is directed to a method that may include transmitting, by a user equipment associated with a network, a dual slot hybrid random access channel comprising a long burst followed by one access burst or one access burst followed by one long burst, where two consecutive time slots are used for the random access channel transmission.

In an embodiment, the dual slot hybrid random access channel may be a dual slot hybrid extended coverage random access channel (EC-RACH). According to one embodiment, additional bits may be included in the long burst (as compared to the access burst) and the additional bits may be used for more training bits and/or more repetitions of data bits, such as repetitions of a block of encoded data. In one embodiment, the additional bits of the first burst after the training bits and subsequent first block of data bits are used for repeated transmissions of the first block of data bits, and the first block of data bits is also repeated at least once in the access burst. In an embodiment, a group of guard bits may be placed between two blocks of data bits. According to one embodiment, the group of guard bits may be a copy of the last TSC bits in case the TSC precedes the data bits in the burst, or may be a copy of the first TSC bits in case the data bits precede the TSC in the burst.

According to an embodiment, the method may further include receiving, from the network, an indication of which format of the dual slot hybrid random access channel (e.g., EC-RACH) is to be used. In one embodiment, the method may also include selecting or applying the indicated format of the dual slot hybrid random access channel (e.g., EC-RACH) for channel access.

According to one embodiment, the two adjacent bursts are transmitted with phase coherency, the access burst is transmitted with timing advance 0, and the normal burst is transmitted with timing advance 0 if it precedes the access burst and with a predefined timing advance if it follows the access burst.

Another embodiment is directed to an apparatus, which may include at least one processor and at least one memory including computer program code. The at least one memory and computer program code are configured, with the at least one processor, to cause the apparatus at least to transmit a dual slot hybrid random access channel comprising a long burst followed by one access burst or one access burst followed by one long burst, where two consecutive time slots are used for the random access channel transmission.

In an embodiment, the dual slot hybrid random access channel may be a dual slot hybrid extended coverage random access channel (EC-RACH). According to one embodiment, additional bits may be included in the long burst (as compared to the access burst) and the additional bits may be used for more training bits and/or more repetitions of data bits, such as repetitions of a block of encoded data. In one embodiment, the additional bits of the first burst after the training bits and subsequent first block of data bits are used for transmissions of the first block of data bits, and the first block of data bits is also repeated at least once in the access burst. In an embodiment, a group of guard bits may be placed between two blocks of data bits. According to one embodiment, the group of guard bits may be a copy of the last TSC bits in case the TSC precedes the data bits in the burst, or may be a copy of the first TSC bits in case the data bits precede the TSC in the burst.

According to an embodiment, the at least one memory and computer program code are further configured, with the at least one processor, to cause the apparatus at least to receive an indication of which format of the dual slot hybrid random access channel (e.g., EC-RACH) is to be used. In one embodiment, the at least one memory and computer program code are further configured, with the at least one processor, to cause the apparatus at least to select or apply the indicated format of the dual slot hybrid random access channel (e.g., EC-RACH) for channel access.

According to one embodiment, the two adjacent bursts are transmitted with phase coherency, the access burst is transmitted with timing advance 0, and the normal burst is transmitted with timing advance 0 if it precedes the access burst and with a predefined timing advance if it follows the access burst.

Another embodiment is directed to a method that may include receiving, by a network node, a dual slot hybrid random access channel comprising a long burst followed by one access burst or one access burst followed by one long burst, where two consecutive time slots are used for random access channel transmission.

In an embodiment, the dual slot hybrid random access channel may be a dual slot hybrid extended coverage random access channel (EC-RACH). According to one embodiment, the method may also include IQ combining both of the bursts, and identifying training sequence code (TSC) location and start of the bursts. In an embodiment, the method may also include, after identifying the start of both bursts, identifying positions of additional bits in the bursts.

The method may further include, in one embodiment, using the additional bits to perform coherent IQ combining of the data bits. According to certain embodiments, the method may also include equalizing the data bits and decoding the data bits. According to one embodiment, when the timing advance (TA) is known, both bursts use a long burst and the additional bits are used to improve sensitivity performance or carry additional data.

Another embodiment is directed to an apparatus, which may include at least one processor and at least one memory including computer program code. The at least one memory and computer program code are configured, with the at least one processor, to cause the apparatus at least to receive a dual slot hybrid random access channel comprising a long burst followed by one access burst or one access burst followed by one long burst, where two consecutive time slots are used for random access channel transmission.

In an embodiment, the dual slot hybrid random access channel may be a dual slot hybrid extended coverage random access channel (EC-RACH). According to one embodiment, the at least one memory and computer program code are further configured, with the at least one processor, to cause the apparatus at least to IQ combine both of the bursts, and identify training sequence code (TSC) location and start of the bursts. In an embodiment, the at least one memory and computer program code are further configured, with the at least one processor, to cause the apparatus at least to, after identifying the start of both bursts, identify positions of additional bits in the bursts. In one embodiment, the at least one memory and computer program code are further configured, with the at least one processor, to cause the apparatus at least to use the additional bits to perform coherent IQ combining of the data bits. According to certain embodiments, the at least one memory and computer program code are further configured, with the at least one processor, to cause the apparatus at least to equalize the data bits and decode the data bits. According to one embodiment, when the timing advance (TA) is known, both bursts may be a long burst and the additional bits are used to improve sensitivity performance or carry additional data.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   transmitting, by a user equipment associated with a network, a dual slot hybrid random access channel including a long burst followed by one access burst or including one access burst followed by one long burst, wherein two consecutive time slots are used for random access channel transmission.

2. The method according to claim 1, wherein the dual slot hybrid random access channel comprises a dual slot hybrid extended coverage random access channel.

3. The method according to claim 1, wherein additional bits are included in the long burst as compared to the access burst, and wherein the additional bits are used for more training bits and/or more repetitions of data bits.

4. The method according to claim 3, wherein the additional bits of the long burst after the training bits and subsequent first block of data bits are used for repeated transmissions of the first block of data bits, and wherein the first block of data bits is repeated at least once in the access burst.

5. The method according to claim 1, wherein the transmitting further comprises placing a group of guard bits or tail bits between two blocks of data bits.

6. The method according to claim 1, wherein a group of guard bits or tail bits following a block of data bits is a copy of last training sequence code bits when the training sequence code precedes the data bits in the burst, or wherein a group of guard bits or tail bits preceding a block of data bits is a copy of first training sequence code bits when the data bits precede the training sequence code in the burst.

7. The method according to claim 1, wherein the long burst has a length that is longer than the access burst.

8. The method according to claim 1, wherein the long burst has a length that is equal compared to a normal burst.

9. The method according to claim 1, wherein the access burst comprises a block of data bits and the long burst comprises at least two blocks of said data bits.

10. An apparatus, comprising:
    at least one processor; and
    at least one memory including computer program code,
    wherein the at least one memory and computer program code are configured, with the at least one processor, to cause the apparatus at least to
    transmit a dual slot hybrid random access channel including a long burst followed by one access burst or including one access burst followed by one long burst, wherein two consecutive time slots are used for random access channel transmission.

11. The apparatus according to claim 10, wherein the dual slot hybrid random access channel comprises a dual slot hybrid extended coverage random access channel.

12. The apparatus according to claim 10, wherein additional bits are included in the long burst as compared to the access burst, and wherein the additional bits are used for more training bits and/or more repetitions of data bits.

13. The apparatus according to claim 12, wherein the additional bits of the long burst after the training bits and subsequent first block of data bits are used for repeated transmissions of the first block of data bits, and wherein the first block of data bits is repeated at least once in the access burst.

14. The apparatus according to claim 10, wherein the transmitting further comprises placing a group of guard bits or tail bits between two blocks of data bits.

15. The apparatus according to claim 10, wherein the long burst has a length that is longer than the access burst.

16. The apparatus according to claim 10, wherein the long burst has a length that is equal compared to a normal burst.

17. The apparatus according to claim 10, wherein the access burst comprises a block of data bits and the long burst comprises at least two blocks of said data bits.

18. An apparatus, comprising:
    at least one processor; and
    at least one memory including computer program code,
    wherein the at least one memory and computer program code are configured, with the at least one processor, to cause the apparatus at least to receive a dual slot hybrid random access channel including a long burst followed by one access burst or including one access burst followed by one long burst, wherein two consecutive time slots are used for random access channel transmission.

19. The apparatus according to claim 18, wherein the dual slot hybrid random access channel comprises a dual slot hybrid extended coverage random access channel.

20. The apparatus according to claim 18, wherein the long burst has a length that is longer than the access burst.

* * * * *